(12) United States Patent
Chen

(10) Patent No.: US 10,683,056 B1
(45) Date of Patent: Jun. 16, 2020

(54) BICYCLE PEDAL STRUCTURE

(71) Applicant: TIANJIN XUFENG SPORTS EQUIPMENT MANUFACTURE CO., LTD., Jinghai County, Tianjin (CN)

(72) Inventor: Yu-Chi Chen, Tianjin (CN)

(73) Assignee: TIANJIN XUFENG SPORTS EQUIPMENT MANUFACTURE CO., LTD., Jinghai County, Tianjin (CN)

( * ) Notice: Subject to any disclaimer, the term of this patent is extended or adjusted under 35 U.S.C. 154(b) by 0 days.

(21) Appl. No.: 16/385,362

(22) Filed: Apr. 16, 2019

(51) Int. Cl.
*B62M 3/08* (2006.01)
*F16C 19/04* (2006.01)

(52) U.S. Cl.
CPC .............. *B62M 3/08* (2013.01); *F16C 19/04* (2013.01); *F16C 2326/28* (2013.01)

(58) Field of Classification Search
CPC ........................................................ B62M 3/08
USPC ........................................................ 74/594.4
See application file for complete search history.

(56) References Cited

U.S. PATENT DOCUMENTS

| | | | | |
|---|---|---|---|---|
| 5,852,956 A * | 12/1998 | Chen ...................... | B62M 3/086 74/594.6 |
| 7,174,807 B2 * | 2/2007 | Bryne ...................... | B62M 3/086 36/131 |
| 10,246,160 B2 * | 4/2019 | Kim .................... | A63B 21/4034 |
| 2005/0028639 A1 * | 2/2005 | Chang ........................ | B62J 6/00 74/594.4 |
| 2006/0266154 A1 * | 11/2006 | Hermansen .............. | B62M 3/08 74/594.4 |
| 2011/0088508 A1 * | 4/2011 | Chen ........................ | B62M 3/08 74/594.6 |
| 2011/0247450 A1 * | 10/2011 | Lai ........................... | B62M 3/08 74/594.4 |
| 2015/0122078 A1 * | 5/2015 | Chen ........................ | B62M 3/08 74/594.4 |
| 2017/0015385 A1 * | 1/2017 | Lin ........................... | B62M 3/08 |
| 2017/0059430 A1 * | 3/2017 | Chen .................. | A63B 24/0062 |
| 2017/0253295 A1 * | 9/2017 | Wu .......................... | B62H 1/08 |

FOREIGN PATENT DOCUMENTS

TW    M517153 U    2/2016

* cited by examiner

*Primary Examiner* — Vinh Luong
(74) *Attorney, Agent, or Firm* — Muncy, Geissler, Olds & Lowe, P.C.

(57) ABSTRACT

A bicycle pedal structure includes a pedal body having an axle bore; an axle member axially passing through the pedal body and rotatably combined with the pedal body, with the connection portion of the axle member combined with a crank of a bicycle; and an end cap having a combination portion which is removably combined with another combination of the axle member. The combination bore of the end cap is allowed to be combined with a corresponding tool for driving the axle member to rotate. With such a removable end cap, the replacement of the end cap and pedal components is facilitated.

9 Claims, 5 Drawing Sheets

BICYCLE PEDAL STRUCTURE

BACKGROUND OF THE INVENTION

1. Field of the Invention

The present invention relates to pedal structures, and more particularly, to a bicycle pedal structure.

2. Description of the Related Art

As shown by TWM517153, a conventional bicycle pedal structure includes a pedal body having an axle disposed in the axle bore, with a wear-resisting sleeve mounted around the fastening end of the axle. Also, a resilient washer and an adjustment washing are disposed between the pedal body and the axle, with a forcing member pressing the adjustment washer, the resilient washer, and the wear-resisting sleeve for fixing the axle and the pedal body.

For easily removing the bicycle pedal from the crank, the conventional axle has a hexagonal lock hole at the position limiting end thereof, which is wrenched by a hex wrench, so as to move the pedal from the crank for replacement or maintenance. However, the axle and the fastening bore at the position limiting end are integrally formed. If the lock hole is wrenched and worn by, for example, a hex wrench not completely mounted in the lock hole, the hexagonal shape of the lock hole will be worn into a circular shape. As a result, the hex wrench will idle within the lock hole and is prevented from wrenching the axle, causing the impossibility of removing the pedal from the crank and leading to the difficulty of maintenance.

Based on the fact that the lock hole is usually disposed at and end of the axle away from the crank, one end of the lock hole is embedded in the pedal, with an end surface or a small portion of the end portion exposed. Upon the occurrence of aforementioned lock hole wearing, the user is only allowed to sabotage the pedal for exposing the axle, whereby the axle and the crank are able to be separated by use of other tools (such as a clamp). Such circumstance increases the difficulty for pedal replacement.

Therefore, it is desirable to resolve the issues above.

SUMMARY OF THE INVENTION

For improving the issues above, a bicycle pedal structure is disclosed having a detachable end cap combined with the axle member on where the pedal body is disposed. When the combination bore in the end cap is worn by a tool, the end cap is able to be removed for replacement.

A bicycle pedal structure in accordance with an embodiment of the present invention comprises:

a pedal body having an axle bore;

an axle member having a connection portion and a first combination portion disposed at two opposite ends thereof, the axle member passing through the pedal body, with the connection portion and the first combination portion located at two ends of the axle bore, the connection portion being combined with a crank of a bicycle;

an end cap having a second combination portion and a combination bore disposed at two opposite ends thereof, the end cap removably combined with the first combination portion by the second combination portion, the combination bore combined with a tool for driving the axle member to rotate.

The combination bore of the end cap is formed in a hexagonal shape, and the corresponding tool is a hex wrench.

The axle member is formed in a circular rod, with two lateral sides of one end of the axle member provided with a plane respectively to form the first combination portion. Also, one end of the end cap is provided with a concave forming the second combination portion having a shape corresponding to the outer wall of the first combination portion.

When the end cap is combined with the first combination portion by the second combination portion, the end cap protrudes out of the axle bore.

Therein, the outer wall of the end cap has a cross-sectional face formed in a hexagonal shape.

Therein, the pedal body has a shield plate on one side thereof, wherein the shield plate and the pedal body are integrally formed; the end cap is at an inner side of the shield plate; and the shield plate has an opening corresponding to the combination bore.

Therein, the shield plate has two hollow portions disposed on two lateral sides of the opening.

Therein, the connection portion is an outer thread, and the crank has a thread bore, such that the axle member is screwed in the thread bore by the connection portion to be combined with the crank.

Therein, two bearings are disposed at two ends of the axle bore. The axle member accordingly passes through the axle bore and the two bearings, so as to be rotatable with respect to the pedal body. Also, the axle member has an outer thread at one end of the first combination portion, with a nut fastened on the outer thread for positioning the axle member between the two bearings. After the nut being fastened on the outer thread, the end cap is combined with the first combination portion by the second combination portion.

Therein, each bearing comprises a bead retainer and a plurality of beads housed in the bead retainer. When the axle member passes through the axle bore and the two bearings, the axle member has a block portion for blocking the beads of one bearing in the corresponding bead retainer. Also, when the nut is fastened on the outer thread, the axle member has a bead engager for blocking the beads of another bearing in the corresponding bead retainer.

Therefore, when the combination bore of the end cap is worn out and out of work, the worn and deformed end cap is able to be easily removed and replaced, facilitating the convenience for pedal maintenance and replacement.

Also, when combined with the first combination portion by the second combination portion, the end cap protrudes out of the axle bore, such that the axle member is driven to rotate by use of a tool driving the portion of the end cap out of the axle bore, facilitating the convenience of pedal maintenance and replacement.

Further, when the component of the pedal structure is broken and needed to be replaced, after the end cap and the nut being orderly detached, the axle member and the bearings are then able to be detached from the pedal body, further facilitating the convenience of pedal maintenance and replacement.

DETAILED DESCRIPTION OF THE INVENTION

Figure 1:
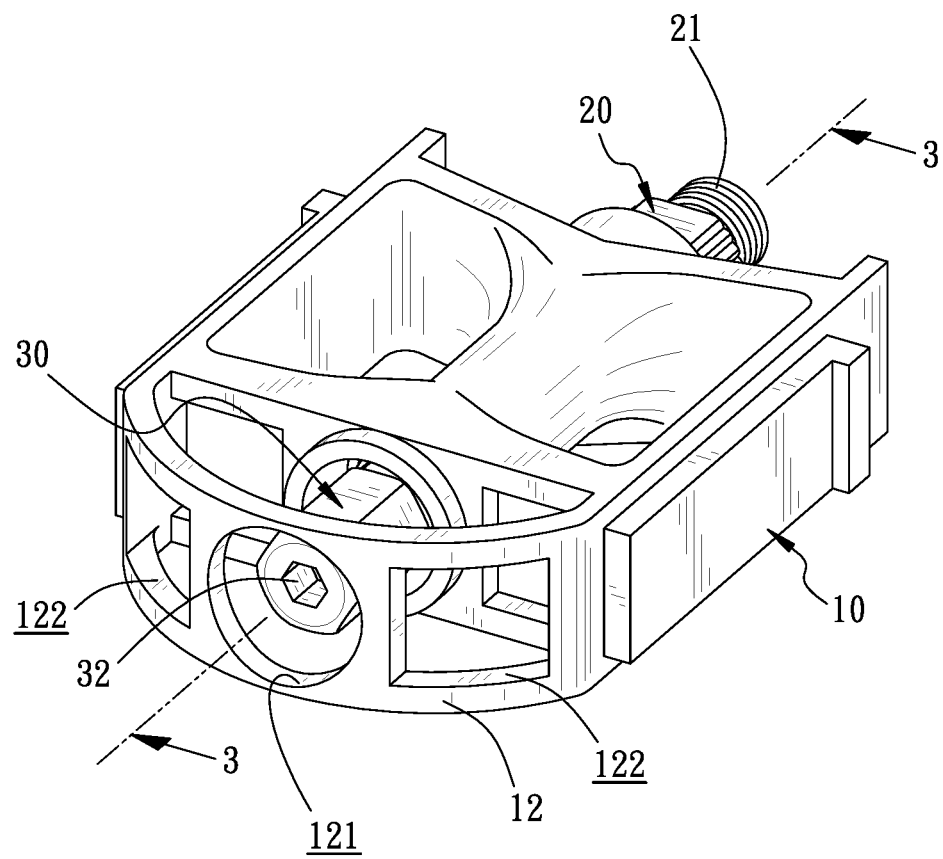
FIG. 1 is a perspective view of the pedal structure in accordance with an embodiment of the present invention.
Figure 2:
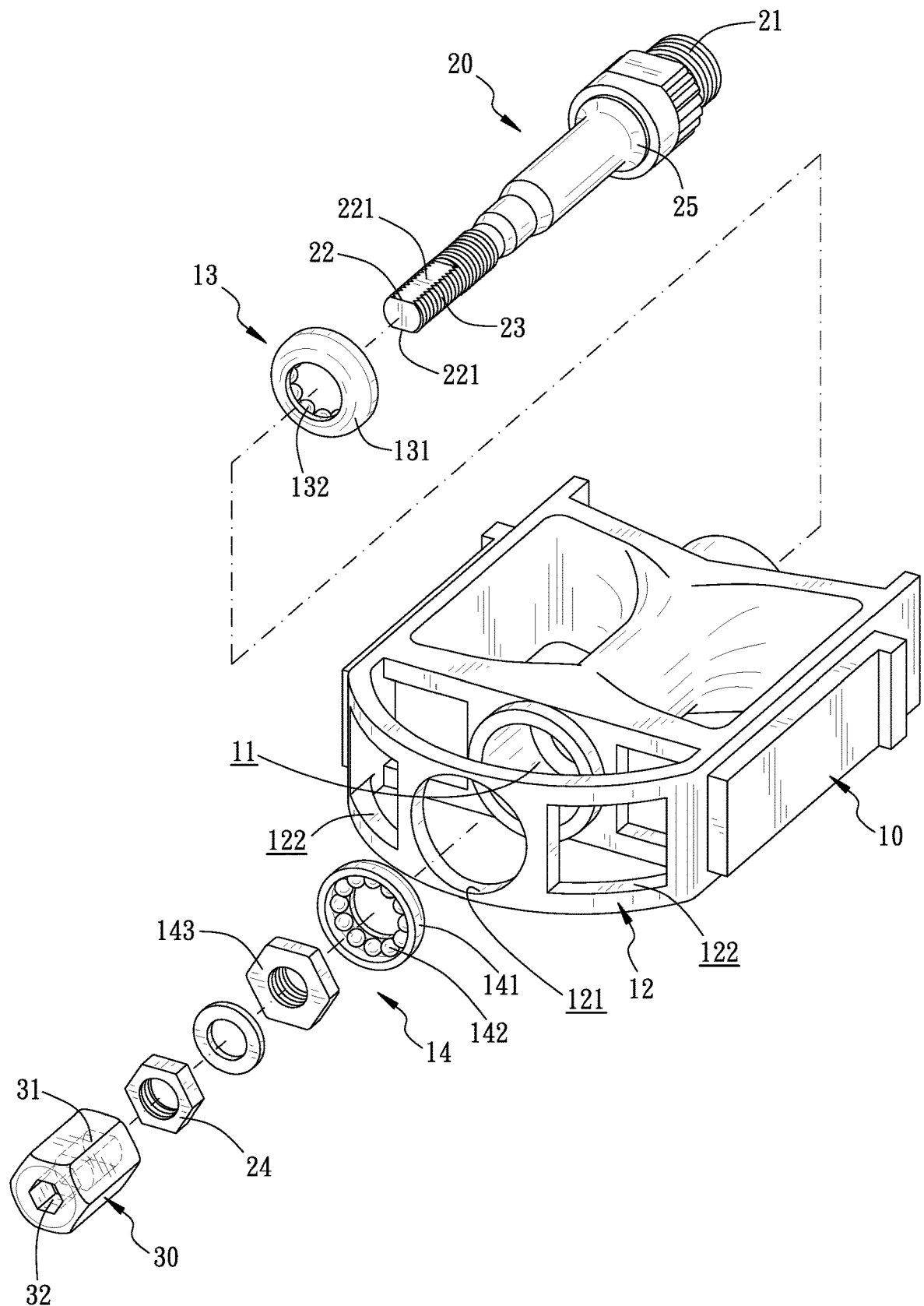
FIG. 2 is an exploded view of the pedal structure.
Figure 3:
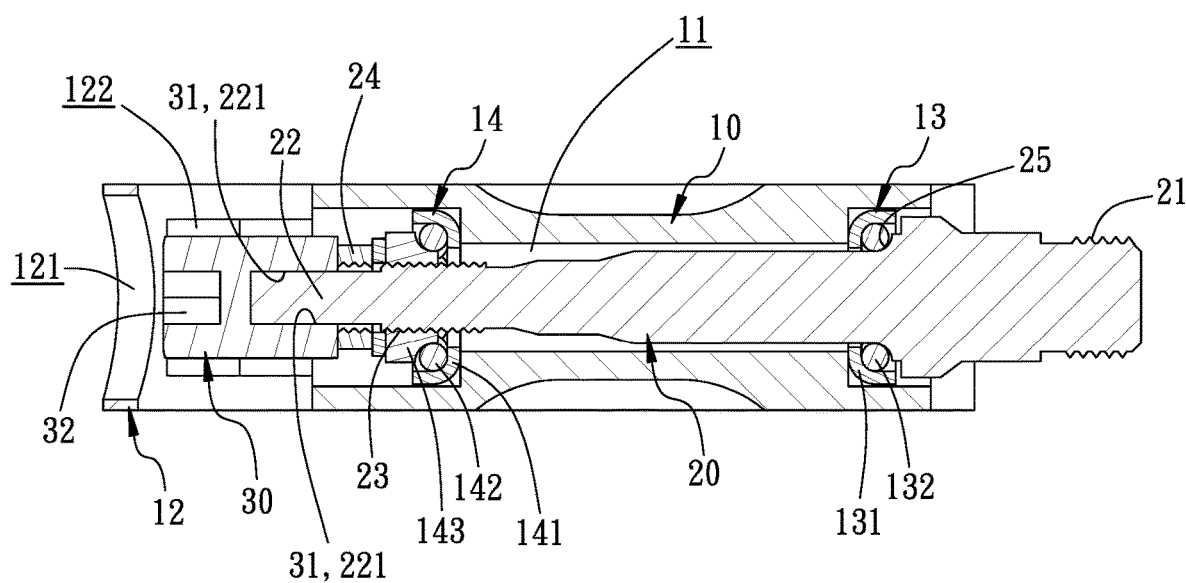
FIG. 3 is a sectional view of the pedal structure.

The aforementioned and further advantages and features of the present invention will be understood by reference to the description of the preferred embodiment in conjunction with the accompanying drawings where the components are illustrated based on a proportion and applicable variations for explanation but not subject to the actual component proportion.

Referring to FIG. 1 to FIG. 5, a bicycle pedal structure comprises a pedal body 10, an axle member 20, and an end cap 30.

The pedal body 10 has an axle bore 11, with the axle member 20 axially passing through the axle bore 11 and rotatably combined with the pedal body 10. The axle member 20 has a connection portion 21 and a first combination portion 22 disposed at two opposite ends of the axle member 20. Also, the connection portion 21 and the first combination portion 22 are disposed at two opposite ends of the axle bore 11. The connection portion 21 is allowed to be combined with a crank 40 of the bicycle. In an embodiment of the present invention, both of the connection portion 21 and the first combination portion 22 at two ends of the axle bore 11 protrude out of the pedal body 10. In an embodiment of the present invention, the connection portion 21 is an outer thread, and the crank 40 has a thread bore 41, such that the connection portion 21 is fastened with the thread bore 41, whereby the axle member 20 is combined with the crank 40.

Figure 4:
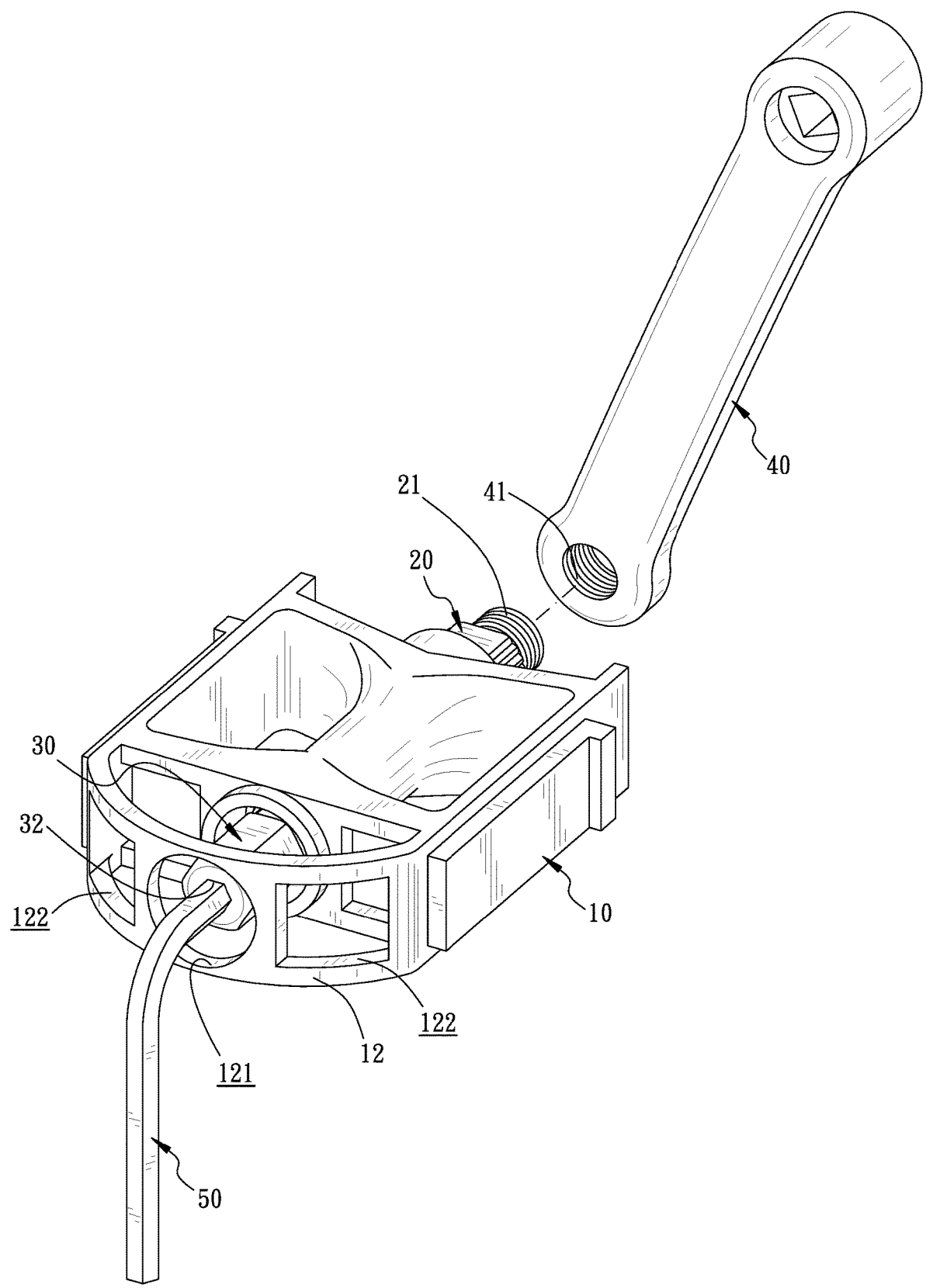
FIG. 4 is a schematic view of the pedal structure illustrating the axle member being driven by a hex wrench.

The end cap 30 has a second combination portion 31 and a combination bore 32 disposed at two opposite ends of the end cap 30. The second combination portion 31 of the end cap 30 is removably combined with the first combination portion 22. The combination bore 32 is allowed to be combined with a tool for driving the axle member 20 to rotate. In an embodiment of the present invention, the axle member 20 is formed in a circular rod, with two lateral sides of one end of the axle member 20 provided with a plane 221 respectively to form the first combination portion 22. Also, one end of the end cap 30 is provided with a concave forming the second combination portion 31, which has a shape corresponding to the outer wall of the first combination portion 22. When the second combination portion 31 of the end cap 30 is combined with the first combination portion 22 of the axle member 20, the end cap 30 is driven to drive the axle member 20 to rotate. Further, the combination bore 32 of the end cap 30 is formed in a hexagonal shape, and the corresponding tool is a hex wrench 50. The hex wrench 50 is combined with the combination bore 32 for driving the end cap 30 to rotate (as shown by FIG. 4).

Figure 5:
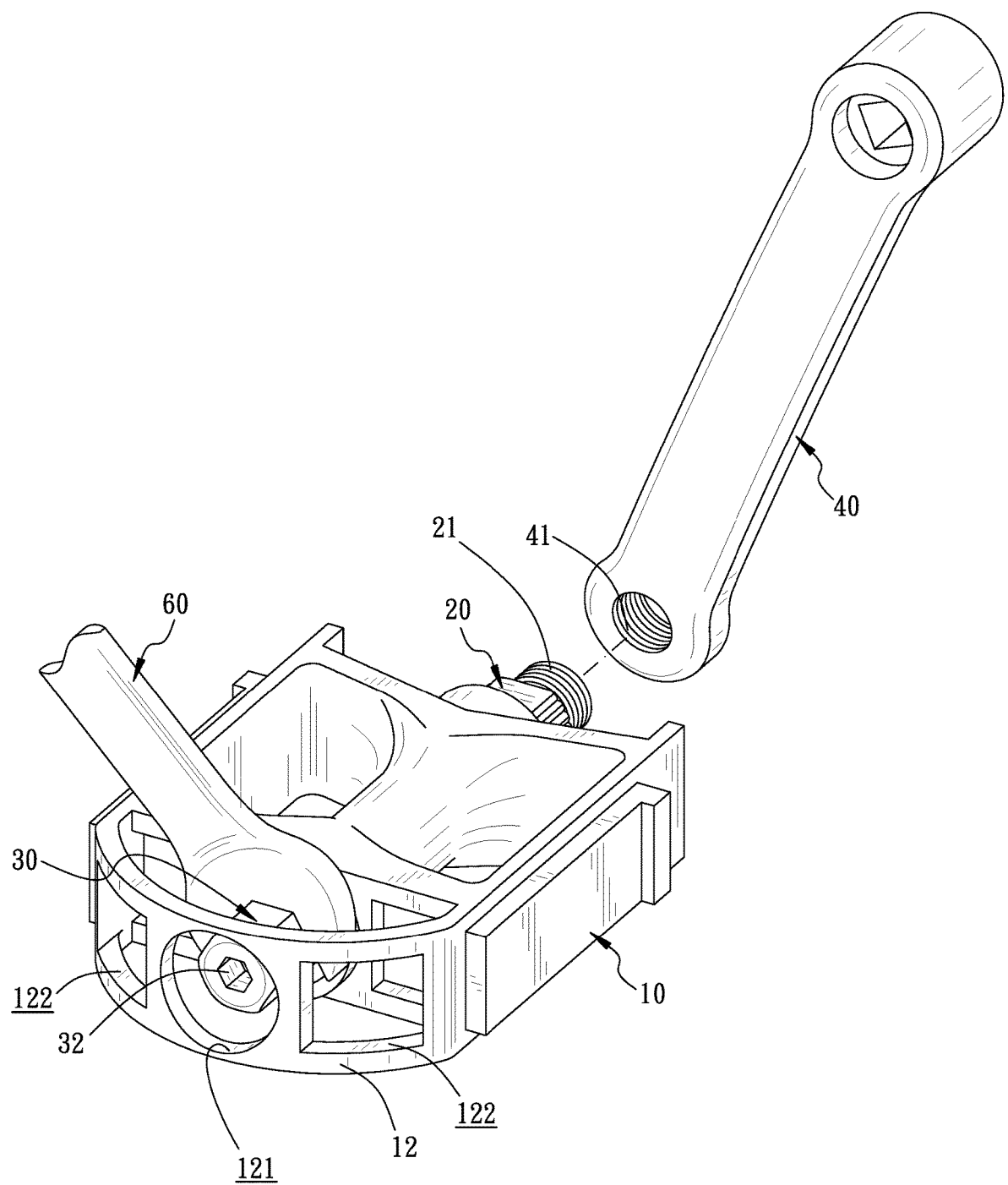
FIG. 5 is a schematic view of the pedal structure illustrating the axle member being driven by an open-end wrench.

Accordingly, when the second combination portion 31 of the end cap 30 is combined with the first combination portion 22, the end cap 30 protrudes out of the axle bore 11. Also, in a preferred embodiment, the outer wall of the end cap 30 in the embodiment has a cross-sectional face formed in a hexagonal shape. Therefore, as an alternative option of applying the hex wrench 50 upon the combination bore 32, the end cap 30 is also allowed to be driven by use of an open-end wrench 60 (as shown by FIG. 5) or an adjustable wrench (not shown). Sectional shape of the outer wall of the end cap 30 is not limited to the aforementioned preferred hexagonal shape. For example, the sectional shape of the outer wall of the end cap 30 is allowed to be a circular shape, such that a pipe wrench (not shown) is able to be used for driving the axle member 20 to rotate.

In an embodiment of the present invention, the pedal body 10 has a shield plate 12 at the side of provided with the end cap 30, wherein the shield plate 12 and the pedal body 10 are integrally formed. The end cap 30 is disposed on the inner side of the shield plate 12. The shield plate 12 has an opening 121 corresponding to the combination bore 32, such that the hex wrench 50 is allowed to pass through the opening 121 to be combined with the combination bore 32. Also, the shield plate 12 has two hollow portions 122 disposed on two sides of the opening 121, respectively. With the hollow portions 122, the material of the structure is saved, and the weight of the structure is decreased.

In an embodiment of the present invention, the pedal body 10 has two bearings 13, 14 disposed at two ends of the axle bore 11, and the axle member 20 passes through the axle bore 11 and the bearings 13, 14, so as to be rotatable with respect to the pedal body 10. Also, the axle member 20 has an outer thread 23 disposed at one end of the first combination portion 22, with a nut 24 fastened on the outer thread 23 for positioning the axle member 20 between the bearing 13 and the bearing 14. After the nut 24 being fastened on the outer thread 23, the end cap 30 is combined with the first combination portion 22 by the second combination portion 31. Further, the bearing 13 comprises a bead retainer 131 and a plurality of beads 132. Also, the bear 14 comprises a bead retainer 141 and a plurality of beads 142. The beads 132, 142 are housed in the corresponding bead retainer 131, 141. When the axle member 20 passes through the axle bore 11 and the bearings 13, 14, the axle member 20 has a block portion 25 for blocking the beads 132 of the bearing 13 in the corresponding bead retainer 131. Also, when the nut 24 is fastened on the outer thread 23, the axle member 20 has a bead engager 143 for blocking the beads 142 of the bearing 14 in the corresponding bead retainer 141.

With the foregoing configuration, advantages of the present invention will be illustrated below.

When the combination bore 32 of end cap 30 is driven by the tool (such as the hex wrench 50), if the combination bore 32 is worn or deformed to be out of work due to frequent usage or inappropriate operation, the end cap 30 is removable from the axle member 20, facilitating the replacement of a new end cap 30. Therefore, the issue of a conventional pedal unable to be detached from the crank 40 due to a worn lock hole of the axle is resolved.

The end cap 30, which is combined with the first combination portion 22 by the second combination portion 31, protrudes out of the axle bore 11. When the combination bore 32 of the end cap 30 is worn, even if the broken end cap 30 is not yet replaced, or if no hex wrench 50 is available for driving the combination bore 32, the aforementioned open-end wrench 60, adjustable wrench (upon the outer wall of the end cap 30 having a hexagonal cross-sectional face) or pipe wrench (upon the outer wall of the end cap 30 having a circular cross-sectional face) are still usable for driving the protruding portion of the axle member 20. In other words, the axle member 20 is able to be driven by various tool to rotate, facilitating the pedal maintenance and replacement.

When the pedal structure has any broken components in need of replacement, after the end cap 30 and the nut 24 being removed, the axle member 20 is able to be detached from the pedal body 10, including the bearings 13, 14. During the removing operation of such components, the pedal body 10 does not need to be sabotaged, thus keeping the complete structure of the pedal body 10 and improving the convenience of pedal maintenance and replacement.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A bicycle pedal structure, comprising:
   a pedal body having an axle bore;
   an axle member having a connection portion and a first combination portion disposed at two opposite ends thereof, the axle member axially passing through the axle bore and rotatably combined with the pedal body, with the connection portion and the first combination portion located at two ends of the axle bore, the connection portion being combined with a crank of a bicycle;
   an end cap having a second combination portion and a combination bore disposed at two opposite ends thereof, the end cap removably in contact with the first combination portion by the second combination portion, the combination bore configured to be combined with a corresponding tool for driving the axle member to rotate;
   wherein when the second combination portion is combined with the first combination portion, the end cap protrudes out of the axle bore.

2. The bicycle pedal structure of claim 1, wherein the combination bore of the end cap is formed in a hexagonal shape, and the corresponding tool is a hex wrench.

3. The bicycle pedal structure of claim 2, wherein axle member is formed in a circular rod, with two lateral sides of one end of the axle member provided with a plane respectively to form the first combination portion; one end of the end cap has the second combination portion having a shape corresponding to the first combination portion.

4. The bicycle pedal structure of claim 1, wherein an outer wall of the end cap has a cross-sectional face formed in a hexagonal shape.

5. The bicycle pedal structure of claim 4, wherein the pedal body has a shield plate on one side thereof, wherein the shield plate and the pedal body are integrally formed; the end cap is at an inner side of the shield plate; and the shield plate has an opening corresponding to the combination bore.

6. The bicycle pedal structure of claim 5, wherein the shield plate has two hollow portions disposed on two lateral sides of the opening, respectively.

7. The bicycle pedal structure of claim 1, wherein the connection portion is an outer thread, and the crank has a thread bore, such that the connection portion is screwed in the thread bore, so that the axle member is combined with the crank.

8. The bicycle pedal structure of claim 1, wherein two bearings are disposed at two ends of the axle bore, respectively, and the axle member passes through the axle bore and the two bearings, so as to be rotatable with respect to the pedal body; the axle member has an outer thread at one end of the first combination portion, with a nut fastened on the outer thread for positioning the axle member between the two bearings; when the nut being fastened on the outer thread, the end cap is combined with the first combination portion by the second combination portion.

9. The bicycle pedal structure of claim 8, wherein each bearing comprises a bead retainer and a plurality of beads housed in the bead retainer; when the axle member passes through the axle bore and the two bearings, the axle member has a block portion for blocking the beads of one bearing in the corresponding bead retainer; when the nut is fastened on the outer thread, the axle member has a bead engager for blocking the beads of another bearing in the corresponding bead retainer.

\* \* \* \* \*